United States Patent Office 3,062,957
Patented Nov. 6, 1962

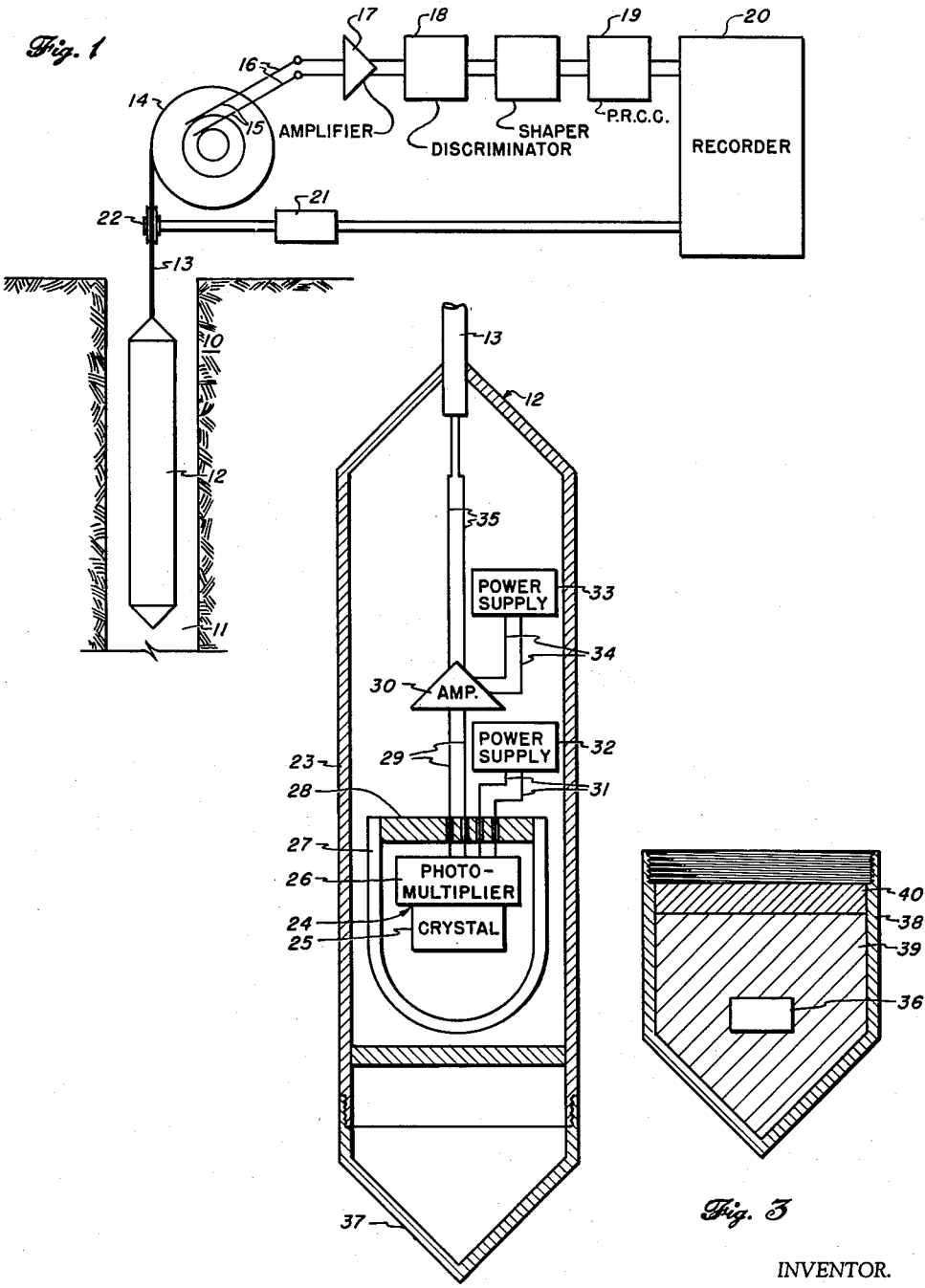

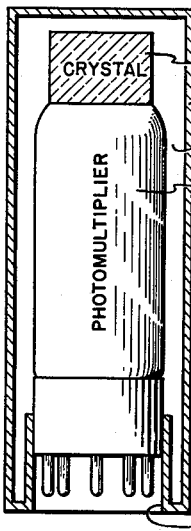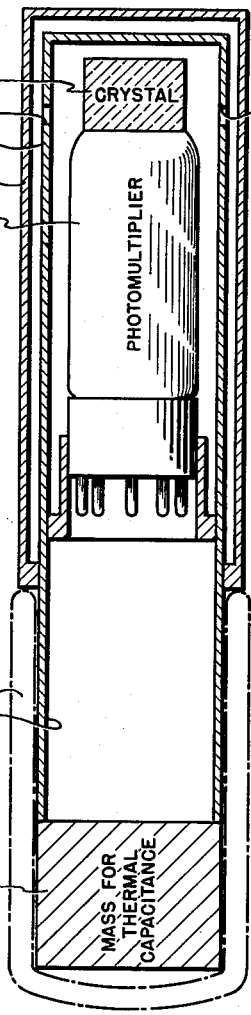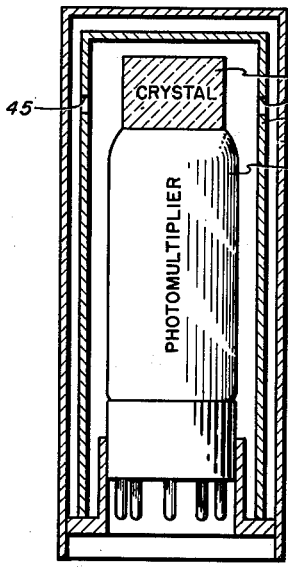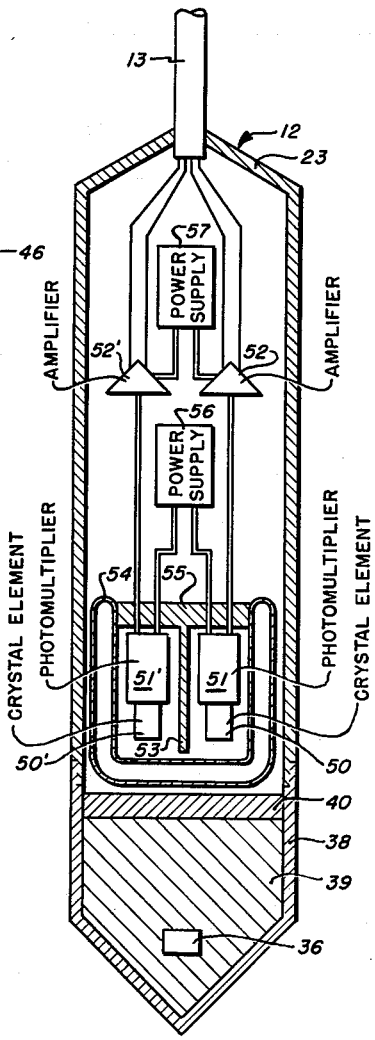
INVENTOR.
ARTHUR H. YOUMANS
BY
ATTORNEY

3,062,957
SCINTILLATION COUNTER FOR NEUTRONS
AND GAMMA RAYS
Arthur H. Youmans, Tulsa, Okla., assignor to Well Surveys, Incorporated, a corporation of Delaware
Original application Dec. 14, 1950, Ser. No. 200,748. Divided and this application Feb. 17, 1958, Ser. No. 715,588
2 Claims. (Cl. 250—71.5)

This invention relates to the art of geophysical prospecting and more particularly to the art of radioactivity well logging wherein scintillation counters comprising fluorescent media in conjunction with photomultipliers are used to detect radiation.

It is old in the art to log oil wells by measuring the natural radioactivity of the strata or by irradiating the strata adjacent the drill hole with fast neutrons or penetrating gamma radiation and simultaneously traversing the well with a gamma ray or neutron detector or both. Such detectors have been of the type which employs a gaseous ionizable medium and produces electrical pulses or continuous current. More recently a detector of relatively high efficiency has been found, the scintillation counter. Scintillation counters may have two types of fluorescent media, solid and liquid. Such media have certain advantages over a gaseous medium—their greater density permits a smaller size detector which is desirable in the small space available in a well logging instrument; their low resolving time permits high speed counting; their high efficiency provides a good signal-to-noise ratio; and their high stopping power is useful in gamma ray and high-energy particle detection. The scintillation counter has been well developed for laboratory use, but it is difficult to use in well logging since it involves the use of fluorescent media which operate less satisfactorily under the high ambient temperatures found in oil wells, and of photosensitive surfaces in photomultipliers which are subject to thermal deterioration at temperatures above 170° F. The temperatures encountered in deep wells may be as high as 400° F.

This invention comprises a scintillation counter adapted for use in radioactivity well logging. This counter may be used to detect neutrons or gamma rays or both. To protect the counter from excessive temperatures, insulation is needed around the counters. Whereas almost any insulating material may be used in the laboratory, the limits of space in a well surveying instrument that must go down a drill hole require that only the very best insulating material be used, i.e., a vacuum such as is provided by a Dewar flask.

Therefore, the primary object of this invention is to provide a method and apparatus for making a well log by detecting radiation in the well with a scintillation counter. Another object is to adapt a scintillation counter comprising a crystal and photomultiplier to use in a drill hole of restricted lateral dimensions for detecting radiation. This invention also contemplates the use of scintillation counters which employ liquids or crystals as scintillating media in the subsurface apparatus used in well surveying. A still further object of this invention is to provide means for protecting a scintillation counter when used in a subsurface well surveying instrument from the effects of high temperatures which may be encountered in certain wells. Another object of this invention is to provide a method and apparatus for making a neutron log of a well by excluding signals produced by gamma radiation in the detector as well as other signals such as dark currents originating in the photomultiplier of the scintillation counter. Other objects and advantages of the present invention will become apparent from the following detailed description when considered with the accompanying drawings, in which:

FIGURE 1 is a diagrammatic illustration of a geophysical well logging operation;

FIGURE 2 is an enlarged vertical sectional view of one form of the subsurface instrument;

FIGURE 3 is an enlarged vertical sectional view of a radiation source sub adapted to be attached to the bottom of the instrument shown in FIGURE 2;

FIGURE 4 is a vertical sectional view of a modified form of insulating means for scintillation counters;

FIGURE 5 shows a further modification of the insulating means;

FIGURE 6 shows still another modification of insulating means which utilizes a thermal capacitance; and FIGURE 7 is an enlarged vertical sectional view of a modified form of subsurface instrument in which two detectors are used.

In the art of radioactivity well logging, certain logs are made by measuring the gamma radiation naturally emitted by the well. The weakness of this radiation has heretofore made it necessary to use extremely complicated electrical circuits and bulky gaseous detectors in order to produce proportionally related electrical signals of sufficient intensity that they can be transmitted to the surface and recorded. The scintillation counter is particularly adaptable for detecting natural radioactivity since it involves simpler circuits and provides a compact instrument of high efficiency and low resolving time. Other radioactivity logs are made by irradiating the formations adjacent the drill hole and detecting gamma radiation or neutrons influenced thereby. In FIGURE 1 of the drawings there is illustrated a well surveying operation in which any of these logs may be made.

A well 10 penetrates the earth's surface 11 and may or may not be cased. Disposed within the well is subsurface instrument 12 of the well logging system. Instrument 12 houses the scintillation counter. Cable 13 suspends the instrument in the well and electrically connects the instrument with the surface apparatus. The cable is wound on or unwound from drum 14 in raising and lowering instrument 12 to traverse the well. Through sliprings 15 and brushes 16 on the end of the drum, the cable is electrically connected to amplifier 17 which is in turn connected through pulse height discriminator 18 and pulse rate conversion circuit 19 to recorder 20. Recorder 20 is driven through a transmission 21 by measuring reel 22 over which cable 13 is drawn so that recorder 20 moves in correlation with depth as instrument 12 traverses the well.

Subsurface instrument 12 shown in FIGURE 1 may take the form illustrated diagrammatically in vertical section in FIGURE 2. The instrument as shown in FIGURE 2 is adapted for use in making a log of a drill hole by measuring the natural radioactivity emitted by the formations.

Instrument 12 comprises a housing 23 which encloses a scintillation counter 24. Scintillation counter 24 which comprises a fluorescent crystal 25 and a photomultiplier 26 may be suitably supported within a Dewar flask 27. The counter may be sealed in the Dewar flask by providing a closure member 28, formed of a suitable heat insulating material. Closure 28 is provided with suitable openings through which conductors may extend from the photomultiplier to a point outside of the Dewar flask enclosure. These conductors comprise conductors 29 which lead to amplifier 30 and conductors 31 which connect to a power supply illustrated schematically at 32. Amplifier 30 may be supplied with power from a second power supply indicated schematically at 33 through conductors 34. The output of amplifier 30 is connected by suitable conductors 35 through a cable 13 to the recording equipment located on the surface of the earth.

Photomultiplier 26 although illustrated as a rectangle in the drawing is to be understood to include the necessary voltage divider and electric circuits for applying the required potentials to it. Additionally it is to be understood that the power supplies 32 and 33 may be replaced by suitable transformers and rectifiers which are supplied with power through the cable 13 from the surface of the earth.

In conducting a survey of a drill hole while using the apparatus illustrated in FIGURE 2, the instrument 12 is caused to traverse the formations penetrated by the well and in so doing radiation emitted by the formations, gamma radiation, impinges upon the crystal 25 of the scintillation counter. The crystal responds to the radiation by producing photons of light which are transmitted through the crystal to the photomultiplier 26. Photomultiplier 26 converts these photons of light into electrons which are multiplied in the multiplier section of the photomultiplier and the resulting current pulses are transmitted through conductors 29 to amplifier 30. The amplified pulses are then conducted via conductors 35 and cable 13 to the surface, where they are recorded in correlation with the depth at which they were produced.

Crystal 25 may be formed of materials such as cadmium tungstate, calcium tungstate, thallium activated sodium iodide (approximately 1 percent thallium) or thallium activated potassium iodide (approximately 1 percent thallium). These crystals when penetrated by radiation relay produce Compton electrons, photoelectrons, or positron electron pairs which give up their energy in the production of photons of light.

As pointed out above certain liquids are adapted for use in scintillation counters. Such liquids are solutions of one percent anthracene dissolved in xylene and para-diphenyl-benzene (terphenyl) dissolved in phenylcyclohexane or xylene. When using a liquid in place of the crystal 25, it is only necessary to replace the crystal with a suitable container filled with a scintillation liquid. In operation the liquid responds to radiation in a similar manner to that described in connection with the crystal and in the same fashion the resulting photons of light are transmitted to the photomultiplier, which produces pulses of current that may be amplified, transmitted to the surface, and recorded.

In the methods for detecting gamma rays described immediately above, the photons of light were produced in the scintillation media by the reaction of the gamma radiation with the atoms of the scintillation media. Gamma radiation can also be detected by enclosing the scintillation media within a material which reacts, when exposed to gamma radiation, to give up charged particles which, on entering the scintillation media, produce photons of light which are transmitted to the photomultiplier in the manner described above. The material within which the crystal is enclosed should be a heavy material such as lead or some other heavy metal. This crystal-enclosing metal may be formed about the crystal or may be a coating applied directly to the crystal. The thickness of the enclosing metal will be determined by the hardness of the gamma radiation that it is desired to detect. The detection process when using a crystal enclosed in a heavy metal involves the liberation of charged particles by the heavy metal when it is struck by gamma radiation. These charged particles enter the scintillation media and produce photons of light which are utilized as described above.

As shown in FIGURE 1 it is necessary to use a pulse height discriminator in conjunction with the scintillation counter recording system. Pulse height discriminator 18 functions to establish a threshold for determining which signals are transmitted to the recorder. Discriminator 18 may be regulated in a manner well-known in the art to pass to the recorder only pulses above a selected magnitude. The use of a discriminator is necessary because the photomultiplier of the scintillation counter produces what are known in the art as "dark currents." These dark currents are evidenced by pulses of relatively small magnitude which may be blocked from the recorder by the discriminator.

In order to make a log which will be a continuous trace or curve drawn in correlation with the depth at which the radiation is detected, pulse rate conversion element 19 is interposed in the recording system of FIGURE 1. This element functions in a conventional manner, well-known in the art, to produce a direct current that varies in magnitude in accordance with the rate of occurrence of the pulses fed to it.

The instant invention as described thus far finds equal application in making well logs when using a source of radiation. In operation the subsurface device illustrated in FIGURE 2 may be modified to include a radiation source 36 by removing the bottom portion 37 of the housing thereof and replacing it with the sub shown in FIGURE 3 which carries the radiation source 36. If source 36 emits both neutrons and gamma rays and only neutrons are desired, then the sub shown in FIGURE 3 comprises the housing 38 which encloses a high density gamma ray absorber 39 in which is embedded a radiation source 36. It will be desirable to interpose between the radiation source and the detector a neutron absorbing shield. This may be located in the sub as indicated at 40 in FIGURE 3. If source 36 is a gamma ray source, absorber 39 is omitted and absorber shield 40 may be made of a high density material to stop direct passage of gamma rays from source to detector.

The apparatus resulting from the combination of the devices illustrated in FIGURES 2 and 3 is adapted for use in making a neutron-gamma ray log, that is a log which represents gamma radiation produced by neutron interactions in the formations. In this instance the source of radiation 36 would be one which emits neutrons. A gamma-gamma log, that is, one made by irradiating the formations with penetrating gamma radiations and detecting gamma radiations influenced by the formations, can also be made without modifying the detecting or recording system of the device. In this instance the radiation source 36 would be one which emits penetrating gamma radiations.

The scintillation counter is readily adapted to detect neutrons by replacing the scintillation medium used for the detection of gamma radiation by one which will respond to neutrons. Such a scintillation medium would be a crystal formed of a material such as cadmium tungstate, the neutron absorber being in this case cadmium; any other crystal having a material such as boron dispersed through it may alternatively be used; or the scintillation medium may be a liquid such as a solution consisting of xylene with one percent anthracene, having granulated pyrex glass which is rich in boron dispersed therein.

Neutrons may also be detected by enclosing the scintillation medium disclosed for the detection of gamma radiation within a substance that will absorb the neutrons and in so doing emit radiation which will enter the scintillation media and produce measurable photons of light. When using a crystal this neutron reactive material may be formed about the crystal or made in the form of a coating for the crystal.

Such neutron reactive materials that are suitable for use as coatings for crystals are cadmium, boron, lithium, gadolinium, or uranium. The cadmium or gadolinium strongly absorbs slow neutrons and thereupon emits gamma radiation to which a scintillation medium will respond. Boron and lithium absorb slow neutrons and simultaneously emit alpha rays which will produce photons of light in the scintillation medium on entering it. Uranium may react with either slow or fast neutrons, depending on which of the isotopes is involved, and subsequently undergo fission. The high energy fission fragments and simultaneously emitted gamma and beta rays may react with the scintillation medium to produce photons of light. Fission results when the isotope $U^{235}$ absorbs slow neutrons whereas fission of $U^{238}$ result from capture of fast neutrons.

Obviously, when the coating material is opaque to the photons of light produced by radiation impinging upon the crystal a window must be provided in order for the photons of light to escape from the crystal and bombard the light-sensitive cathode element of the photomultiplier. It is to be understood that the scintillation medium may be in the form of a plurality of particles or be a single element of such geometry that a large portion of the crystal may be subjected to the neutron produced radiation. For example, when using a crystal such as calcium tungstate the scintillation medium may be formed from a plurality of elongated rod-like crystal elements having cross sectional dimensions such that they can be closely fitted together and disposed in such a manner that their axes extend toward the photocathode. The individual surfaces of these elements may be coated with the neutron reactive material.

When a liquid is used as a scintillation medium the container for the liquid may be formed of or coated with neutron reactive material. Such materials in this instance may be the same as those recited immediately above as suitable for coating materials for crystals.

The invention as described thus far has included means for protecting the scintillation counter against high temperatures which may be encountered in wells. In many shallow wells the variations in temperature are so slight that they produce no adverse effects and as a result the protective means for the scintillation counter may be omitted. However, in the majority of the wells, particularly the deep wells surveyed by the radioactivity logging methods, temperatures are encountered which produce thermal deterioration of the photosensitive surfaces in the photomultiplier and lower the efficiency of some crystals as detectors of radiation to a point below that of the conventional detectors of the prior art, unless precautions are taken. The temperatures at which the photosensitive surfaces of the present commercially available photomultipliers will be subject the thermal deterioration are those above approximately 170° F. However, temperatures encountered in deep wells may be as high as 400° F. Under such conditions it is desirable to protect the scintillation counter by enclosing it in the most efficient heat insulating means permitted by the dimensions of the drill hole. To this end we have provided an evacuated spaced wall and jacket element which has been heretofore referred to in connection with the description of FIGURE 2 as a Dewar flask.

In FIGURE 4 there is illustrated a modified form of the invention in which the crystal 25 and photomultiplier tube 26 are enclosed in a hermetically sealed chamber 41. Chamber 41 is defined by an inner wall formed of the envelope of the photomultiplier tube 26 and the outer surface of the crystal element 25 and an outer wall in the form of a concentrically disposed outer cylindrical container 42 that is closed at one end. Container 42 has an inner annular element 43 of reduced diameter made integral with the open end thereof or secured thereto as by welding and which is adapted to engage the side wall of the base of the photomultiplier tube 26. A vacuum tight seal is formed between the base of tube 26 and the annular element 43. The chamber thus formed is then evacuated and sealed off. In order to further reduce transfer of heat to the crystal element 25 and photomultiplier tube 26 all surface presented to the chamber 41 may be silvered.

Another form of heat insulating means for the crystal 25 and photomultiplier tube 26 is shown in FIGURE 5. This form of the heat insulating means differs from that shown in FIGURE 4 in that a second cylindrical envelope 44 is concentrically disposed about the photomultiplier tube 26 and its associated crystal 25 but intervenes between the photomultiplier tube and its associated crystal and the container 42. By venting the container 44 as at 45 and 46, the evacuated region in FIGURE 5 is identical with that disclosed in connection with FIGURE 4. The intervening container 44, however, in the instant form of the invention provides an outer surface which may be silvered instead of applying the coating to the envelope of the photomultiplier tube 26 and those portions of the surfaces of crystal element 25 which are exposed to the evacuated chamber.

Still another form of insulating means for a scintillation counter is disclosed in FIGURE 6. This form of the invention differs from that disclosed in FIGURE 5 in that there is provided a relatively large thermal capacitance 47 which is arranged in thermal conductance with the guard formed by container 44. The thermal conductor connecting the container 44 with the thermal capacitance 47 may be an extension 48 of the container 44 which extends beyond the base of the photomultiplier tube and contacts the thermal capacitance 47. Thermal capacitance 47 may be a mass of water, ice, or other material of large thermal capacity. With this arrangement the rate of temperature rise of the photomultiplier assembly will be inversely proportional to the thermal capacity. It is evident that the photomultiplier tube will never become warmer than the enclosing container 44. Thermal capacitance 47 may be enclosed in a suitable heat insulating material, preferably disposed within a Dewar flask 49 which is illustrated in dotted lines in FIGURE 6. It is possible to dispense with the Dewar flask 49 by extending the outer housing 42 which surrounds the guard container 44 to enclose the entire thermal capacitance 47 and thereby provide a chamber which can be hermetically sealed, it being understood that hermetically sealed electrical lead through insulators will be provided through which electrical conductors would pass to make contact with the pins on the base of the photomultiplier tube. It is obvious to those skilled in the art that other methods and apparatus may be employed for heat insulating the crystal element and its associated photomultiplier tube.

FIGURE 7 illustrates a subsurface instrument wherein a plurality of scintillation counters are used. Two such counters are shown comprising crystal elements 50 and 50', photomultipliers 51 and 51', and amplifiers 52 and 53. These counters may be arranged by suitable choice of crystals and/or suitable choice of coating material to be sensitive either to gamma rays or to both gamma rays and neutrons. Thus, to measure only neutrons with this combination element 50 may be cadmium tungstate and crystal element 50' may be calcium tungstate. Since the latter is not sensitive to neutrons, but both may be made equally sensitive to gamma radiation, the combination of the two measurements to yield their difference is indicative of neutron flux density. At the same time, the detection by crystal 50' and photomultiplier 51' indicates gamma ray flux density. The gamma rays thus detected may arise in the formations or they may be produced by neutron interaction in the cadmium tungstate crystal 25. The efficiency with which the combination can detect neutrons may be improved by interposing a gamma radiation absorber 53 between the two crystals or by arranging the geometry so as to make the radiation transfer a minimum.

As shown in FIGURE 7, the scintillation counters comprising the crystal elements 50 and 50' and photomultipliers 51 and 51' may be enclosed in an evacuated hermetically sealed heat insulating element 54 which may be a Dewar flask. Obviously, when such a container is used it would be provided with a closure element 55 that is provided with suitable electrical lead through insulators through which the electrical conductors may pass to the amplifiers 52 and 52' and to the power supply 56. A second power supply 57 may be provided for the amplifiers 52 and 52'.

It is to be understood that this invention is not to be limited to the specific modifications described but is to be limited only by the following claims.

This application is a division of my co-pending application SN 200,748 filed December 14, 1950.

I claim:

1. The method of logging earth formations traversed by a bore hole which comprises passing through said hole a source of neutrons to bombard said formations and cause gamma rays to be induced therein, measuring the intensity of induced gamma radiation entering the hole from the traversed formations, the measurement being made within a zone spaced from said source and having a small vertical dimension as compared to a gas chamber of the type used in well logging to contain a gaseous ionizable medium.

2. A device for logging a bore-hole traversing an earth formation comprising an elongated instrument housing adapted to be passed through the bore-hole while suspended on a conductor cable, a source of neutrons disposed within said housing, a scintillation detector also disposed within the housing and spaced from said source, said scintillation detector having a sensitive surface whose vertical dimension is small as compared to a gas chamber of the type used in well logging to contain a gaseous ionizable medium, means between said source and said detector for absorbing radiation which might otherwise pass directly from the source to the detector, means surrounding the vertical surface of the detector for absorbing neutrons and gamma rays which may be scattered in said formations and returned to the bore-hole, said detector being primarily responsive to gamma rays induced in said formation by neutron bombardment, and means for recording the output of said detector.

References Cited in the file of this patent

UNITED STATES PATENTS

| | | |
|---|---|---|
| 2,469,463 | Russell | May 10, 1949 |
| 2,475,137 | Herzog | July 5, 1949 |
| 2,648,012 | Scherbatskoy | Aug. 4, 1953 |
| Re. 24,226 | Fearon | Oct. 9, 1956 |

UNITED STATES PATENT OFFICE
CERTIFICATE OF CORRECTION

Patent No. 3,062,957                                          November 6, 1962

Arthur H. Youmans

It is hereby certified that error appears in the above numbered patent requiring correction and that the said Letters Patent should read as corrected below.

Column 3, line 31, for "relay" read -- may --; line 72, for "threshod" read -- threshold --; column 5, line 44, for "the" read -- to --; line 66, for "betwen" read -- between --; line 70, for "surface" read -- surfaces --.

Signed and sealed this 11th day of June 1963.

(SEAL)
Attest:

ERNEST W. SWIDER                                    DAVID L. LADD
Attesting Officer                                         Commissioner of Patents